US005443036A

United States Patent [19]

Amiss et al.

[11] Patent Number: 5,443,036

[45] Date of Patent: Aug. 22, 1995

[54] METHOD OF EXERCISING A CAT

[76] Inventors: Kevin T. Amiss, 255 S. Pickett St., #301, Alexandria, Va. 22304; Martin H. Abbott, 10549 Assembly Dr., Fairfax, Va. 22030

[21] Appl. No.: 144,473

[22] Filed: Nov. 2, 1993

[51] Int. Cl.⁶ ............ A01K 29/00

[52] U.S. Cl. ............ 119/707

[58] Field of Search ............ 119/702, 707, 174, 905; 446/485

[56] References Cited

U.S. PATENT DOCUMENTS

| | | | |
|---|---|---|---|
| 3,877,171 | 4/1975 | Sloop et al. | 446/485 |
| 4,208,701 | 6/1980 | Schock . | |
| 4,231,077 | 10/1980 | Joyce et al. . | |
| 4,757,515 | 7/1988 | Hughes . | |
| 4,761,715 | 8/1988 | Brooks . | |
| 4,926,438 | 5/1990 | Maes et al. . | |
| 4,985,029 | 1/1991 | Hoshino . | |
| 5,056,097 | 10/1991 | Meyers . | |
| 5,194,007 | 3/1993 | Marshall et al. . | |

OTHER PUBLICATIONS

Carayan et al., "Effects of tianeptine on the Performance of a reaching movement in a cat", *Psychopharmacology,* vol. 104, Issue 3, Berlin, 1991, pp. 328–336.

Levesque et al., "Visual 'cortical-recipient' and tectal-recepient pontine zones play distinct roles in cat visuomotor performance", *Behavioral Brain Research,* vol. 39, Netherlands, 1990, pp. 157–166.

*Primary Examiner*—Todd E. Manahan

[57] ABSTRACT

A method for inducing cats to exercise consists of directing a beam of invisible light produced by a hand-held laser apparatus onto the floor or wall or other opaque surface in the vicinity of the cat, then moving the laser so as to cause the bright pattern of light to move in an irregular way fascinating to cats, and to any other animal with a chase instinct.

4 Claims, 1 Drawing Sheet

METHOD OF EXERCISING A CAT

BACKGROUND OF THE INVENTION

1. Technical Field

The present invention relates to recreational and amusement devices for domestic animals and, more particularly, to a method for exercising and entertaining cats.

2. Discussion of the Prior Art

Cats are not characteristically disposed toward voluntary aerobic exercise. It becomes the burden of the cat owner to create situations of sufficient interest to the feline to induce even short-lived and modest exertion for the health and well-being of the pet. Cats are, however, fascinated by light and enthralled by unpredictable jumpy movements, as for instance, by the bobbing end of a piece of hand-held string or yarn, or a ball rolling and bouncing across a floor. Intense sunlight reflected from a mirror or focused through a prism, if the room is sufficiently dark, will, when moved irregularly, cause even the more sedentary of cats to scamper after the lighted image in an amusing and therapeutic game of "cat and mouse." The disruption of having to darken a room to stage a cat workout and the uncertainty of collecting a convenient sunbeam in a lens or mirror render these approaches to establishing a regular life-enhancing cat exercise routine inconvenient at best.

SUMMARY OF THE INVENTION

Accordingly, it is an object of the present invention to provide an improved method of exercising a cat in normal day and night lighting environments.

It is a further object of the present invention to provide a method of providing amusing, entertaining and healthy exercise for a cat.

It is yet another object of the present invention to teach a method of exercising a cat effortlessly at any time.

In accordance with the present invention, a light amplification by stimulated emission of radiation (laser) device in a small hand-held configuration is used to project and move a bright pattern of light around a room to amuse and exercise a cat.

The method is effective, simple, convenient and inexpensive to practice and provides healthy exercise for the cat and amusement and entertainment for both the cat and the owner.

These and other objects, features and advantages of the present invention will become apparent from the following description and accompanying drawings of one specific embodiment thereof.

DESCRIPTION OF THE PREFERRED EMBODIMENTS

Figure 1:
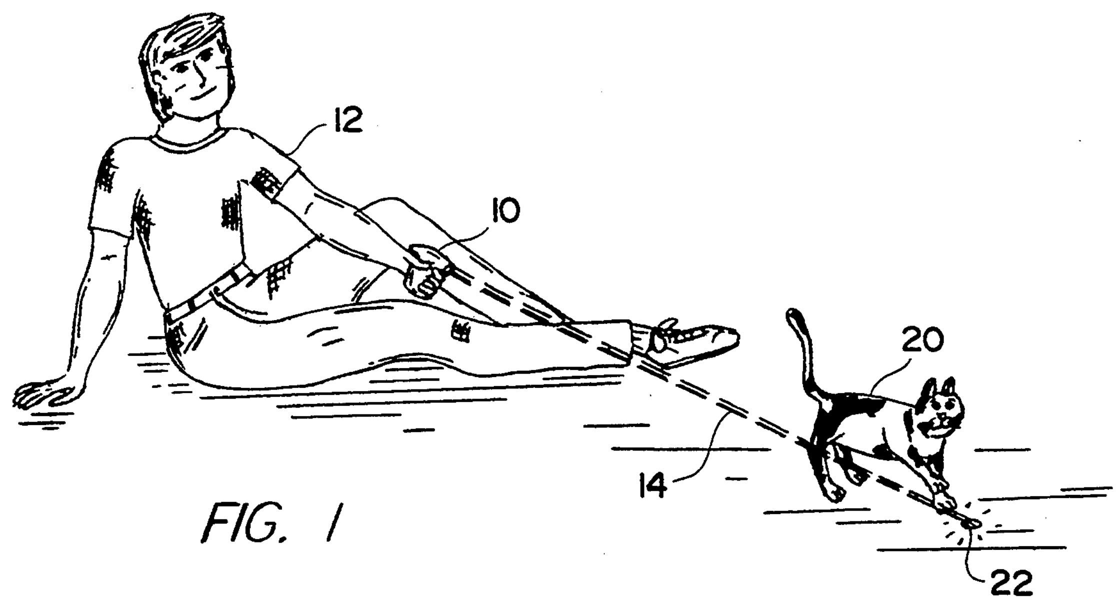
FIG. 1 is a perspective view of a cat owner exercising a cat in accordance with the present invention.
Figure 2:
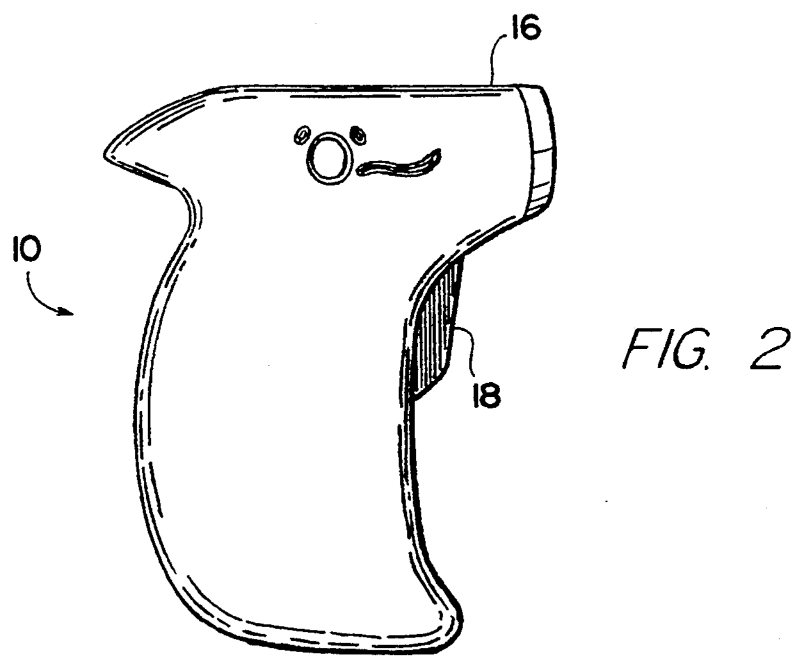
FIG. 2 is a plan view of a hand-held laser exerciser.

Referring to the drawings, a light amplification by stimulated emission of radiation (laser) apparatus 10 for exercising cats, in the hands of a cat owner 12, emits an invisible beam 14 of light from and along the longitudinal axis of the device barrel 16. Activation of the laser cat exerciser 10 is controlled by spring-loaded trigger 18 energizing the laser mechanism by completing a battery power circuit. A cat 20 reacts to the bright pattern of light 22 occurring at the intersection of the laser beam and an opaque surface, for example, the floor or wall of a room.

The involuntary and almost imperceptibly slight movements of the hand holding the laser device of the present invention creates a jittery animated effect in the light pattern at the opaque intersection appealing to cats even when the device is held essentially steady.

Intentional movements of the hand-held cat exerciser cause angular changes in the direction of the beam 14 and consequently the light pattern 22 moves unpredictably about the intersecting surfaces. The cat 20, intrigued by the jumpy movement of the light pattern, experiences a playful and healthy chase impulse and follows the irregularly moving light pattern around the room to the cardio-vascular, respiratory, weight control, and muscle tone benefit of the animal.

The coherent nature of a laser light beam results in a small intensely bright pattern of light clearly visible in normal day light or artificial night illumination, small enough relative to the paw of the cat to cause interest without posing a threat, and sharply defined over long enough distances (e.g., up to 150 feet) to provoke a full workout with long sprints for the pet. Ideally the bright pattern of light is directed along the floor, steps or wall at speeds sufficient to exert and entertain the cat but not so discouragingly fast as to dissuade against the chase, i.e., typically in the general range of 5 to 25 feet per second. In other words, the angular sweep speed of the laser beam is controlled by the cat owner 12 to effect an appropriate linear sweep speed of the pattern on the opaque surface within the stated general range. It is understood, of course, that the angular beam sweep speed required to effect a given linear pattern speed depends upon the distance between the laser and the surface on which the pattern impinges; specifically, as the distance between the laser and the surface increases, the same linear pattern speed is produced by a slower angular beam sweep speed. Release of trigger 18 interrupts the power circuit and extinguishes the laser beam, whereupon the cat can return to more traditionally feline time passing until cat owner 12 re-initiates the laser cat exerciser.

The light pattern projected by the laser cat exerciser is invisible until intersection with an opaque surface. Lasers emitting various colors of coherent light can be used and the laser apparatus can be distinctively shaped and colored for easy identification.

Although particularly suited to amusing and exercising cats, the method of the present invention can be applied to other domestic pets, for instance dogs, ferrets, and any other animals with the chase instinct.

Inasmuch as the present invention is subject to many variations, modifications and changes in detail, it is intended that the subject matter discussed above and shown in the accompanying drawings be interpreted as illustrative and not in a limiting sense.

What is claimed is:

1. A method of inducing aerobic exercise in an unrestrained cat comprising the steps of:

(a) directing an intense coherent beam of invisible light produced by a hand-held laser apparatus to produce a bright highly-focused pattern of light at the intersection of the beam and an opaque surface, said pattern being of visual interest to a cat; and (b) selectively redirecting said beam out of the cat's immediate reach to induce said cat to run and chase said beam and pattern of light around an exercise area.

2. The method of claim 1 wherein said bright pattern of light is small in area relative to a paw of the cat.

3. The method of claim 1 wherein said beam remains invisible between said laser and said opaque surface until impinging on said opaque surface.

4. The method of claim 1 wherein step (b) includes sweeping said beam at an angular speed to cause said pattern to move along said opaque surface at a speed in the range of five to twenty-five feet per second.

* * * * *